United States Patent
Sun et al.

(10) Patent No.: US 9,631,990 B2
(45) Date of Patent: Apr. 25, 2017

(54) DEVICE FOR TESTING MECHANICAL SEAL PERFORMANCE

(71) Applicant: NANJING FORESTRY UNIVERSITY, Nanjing, Jiangsu (CN)

(72) Inventors: Jianjun Sun, Jiangsu (CN); Qiaoan Tu, Jiangsu (CN); Qiong Hu, Jiangsu (CN); Chenbo Ma, Jiangsu (CN); Qiuping Yu, Jiangsu (CN); Min Zhou, Jiangsu (CN)

(73) Assignee: NANJING FORESTRY UNIVERSITY, Nanjing, Jiangsu (CN)

( * ) Notice: Subject to any disclaimer, the term of this patent is extended or adjusted under 35 U.S.C. 154(b) by 0 days.

(21) Appl. No.: 14/889,848

(22) PCT Filed: Dec. 27, 2013

(86) PCT No.: PCT/CN2013/090626
§ 371 (c)(1),
(2) Date: Nov. 7, 2015

(87) PCT Pub. No.: WO2014/180152
PCT Pub. Date: Nov. 13, 2014

(65) Prior Publication Data
US 2016/0146681 A1    May 26, 2016

(30) Foreign Application Priority Data
May 6, 2013    (CN) .......................... 2013 1 0162335

(51) Int. Cl.
*G01L 3/02* (2006.01)
*G01M 3/28* (2006.01)
(Continued)

(52) U.S. Cl.
CPC *G01L 3/02* (2013.01); *G01M 3/26* (2013.01); *G01M 3/2869* (2013.01); *G01M 13/005* (2013.01)

(58) Field of Classification Search
CPC ......... G01L 3/02; G01M 3/26; G01M 3/2869; G01M 13/005
(Continued)

(56) References Cited

U.S. PATENT DOCUMENTS 4,407,171 A * 10/1983 Hasha .................... G01M 3/022
73/46
6,142,478 A * 11/2000 Pecht ..................... F16J 15/3484
277/400

(Continued)

FOREIGN PATENT DOCUMENTS

CN    2234529 Y    9/1996
CN    2428764 Y    5/2001
(Continued)

OTHER PUBLICATIONS

Zhou Jian Feng et al. Research on Mechanical Seal Testing Machine and Its Testing Technique. Petro Chemical Equipment, vol. 32, No. 6, Nov. 2003.

*Primary Examiner* — Max Noori (57) ABSTRACT

A device for testing mechanical seal performance includes a main shaft (4), a working chamber (18) with two end covers (6, 13) respectively located at two ends thereof, and two groups of mechanical seals to be tested (7); wherein a shaft sleeve (5) and the main shaft (4) form a clearance fit and penetrate through the end covers (6, 13) at two ends of the working chamber (18) together; the shaft sleeve (5) extends outside U-shaped openings (23) which are arranged at two ends of the end covers (6, 13) and arranged on the same generatrix; driven pins (15) are arranged on the locations of the main shaft (4) corresponding to the U-shaped openings (23); the middle part of the shaft sleeve (5) is provided with two segments of threads having the same thread pitch and opposite rotating directions.

10 Claims, 4 Drawing Sheets

(51) Int. Cl.
*G01M 3/26* (2006.01)
*G01M 13/00* (2006.01)

(58) Field of Classification Search
USPC .................. 73/52, 54.02, 54.14, 862.191
See application file for complete search history.

(56) References Cited

U.S. PATENT DOCUMENTS

| | | | |
|---|---|---|---|
| 6,599,144 B1 * | 7/2003 | Schumann | G01M 3/26 439/219 |
| 2001/0030396 A1 * | 10/2001 | Pecht | F16J 15/3492 277/317 |
| 2004/0232620 A1 * | 11/2004 | Bock | G01M 3/2869 277/320 |
| 2009/0290971 A1 * | 11/2009 | Shamseldin | F04D 29/124 415/1 |
| 2010/0106429 A1 * | 4/2010 | Horak | G01N 29/14 702/34 |
| 2012/0112416 A1 * | 5/2012 | Berger | F16J 15/3492 277/358 |
| 2014/0326052 A1 * | 11/2014 | Wolters | B65G 23/08 73/46 |

FOREIGN PATENT DOCUMENTS

| | | |
|---|---|---|
| CN | 1308002 A | 8/2001 |
| CN | 2833188 Y | 11/2006 |
| CN | 201448441 U | 5/2010 |
| CN | 102589821 A | 7/2012 |
| CN | 102680175 A | 9/2012 |
| CN | 202420794 U | 9/2012 |
| CN | 102913475 A | 2/2013 |
| CN | 203203760 U | 9/2013 |

\* cited by examiner

DEVICE FOR TESTING MECHANICAL SEAL PERFORMANCE

CROSS REFERENCE OF RELATED APPLICATION

This is a U.S. National Stage under 35 U.S.C 371 of the International Application PCT/CN2013/090626, filed Dec. 27, 2013, which claims priority under 35 U.S.C. 119(a-d) to CN 201310162335.9, filed May 6, 2013.

BACKGROUND OF THE PRESENT INVENTION

Field of Invention

The present invention belongs to the field of sealing testing technology, and more particularly relates to a device for testing mechanical seal performance which has no additional axial force and is capable of accurately testing the torque. The device is adapted for testing mechanical seal performance of the rotating machinery with large diameter including large compressors and centrifugal pumps for conveying high pressure media, or stirred tank reactors for mixing high pressure media.

Description of Related Arts

It is required of mechanical seals with stable performance to meet the demand of large-scale, integration, and long-term operation of the production device. Therefore, device for testing mechanical seal performance with broad operating parameters and convenient test are needed to be designed to adapted for the development and testing of new mechanical seals.

It can be seen from the widely-known technology, the support structure of the main shaft of the device for testing mechanical seal performance is in forms of single cantilever shaft, double cantilever shafts and double support shafts. The main shaft inserts into the end cover at the single side or into the end covers at two sides and out of the working chamber. For the single cantilever shaft type device for testing mechanical seal performance, the main shaft inserts into one end cover of the working chamber, the mechanical seal to be tested is used as a sealing member of the working chamber, such as Patent ZL 00220907.1. However, the shaft ends of the main shaft situates in the medium of the working chamber, generating a larger axial force, and simultaneously, the areas of the rotating rings and the stationary rings of the mechanical seal to be tested bear the action from the medium are different, which also generates the axial force. Large axial force is harmful to the service life of the bearing. Different axial forces lead to different bearing resistance torque, finally the measurement accuracy of the end-face friction torque is affected. For the device with the single cantilever and main shaft passing into and outside end covers at two sides of the working chamber for testing mechanical seal performance, the axial force of the medium in the working chamber at the shaft ends is avoided, two groups of mechanical seals to be tested with a same regulation and size are symmetrically distributed within the working chamber; the shaft sleeve has two segments of thread at one end, the two segments of thread have the same screw pitch and opposite rotation directions; the shaft sleeve is rotated to drive the left and right nuts which are screwed and jointed with the shaft sleeve to move left and right equidistantly, so as to drive the left and right rotating ring seats to tightly press two rotating rings via the springs, for achieving equally loading the end-face specific pressure, such as Patent CN201210037262.6. However, it is very difficult for the two groups of mechanical seals to be symmetrical with the center cross section of the working chamber at the initial position. For double cantilever type device for testing mechanical seal performance, such as Patent ZL88214684.X, the axial force caused by the medium pressure at the single shaft end, and the axial force due to different areas of the rotating and stationary rings of the mechanical seal to be tested bear the medium force, are balanced via the symmetrically whole structure. However, the main shaft and the driving connecting structure are still complex. For double support shafts type device for testing mechanical seal performance, such as Patent CN201210126379.1, the main shaft inserts into and out of the end covers at two ends of the working chamber, two groups of mechanical seal to be tested with a same regulation and size are symmetrically arranged within the working chamber to resolve the balance problem of the axial force and the effect of the winding degree of the cantilever shaft. However, it is very inconvenient for installing the mechanical seal to be tested, and especially it is very difficult to meet the requirements of quick assembly and disassembly during type experiments.

The above existing technologies, while experimenting, the torque sensor tests the total torque on the main shaft in the experimenting device, the total torque includes the friction torque of the sealing end face to be tested and the friction torque of the bearing of the main shaft. The friction torque of the sealing end face to be tested equals to the total torque minus the friction torque of the bearing of the main shaft measured before experiment. Therefore, not only the experimental process is complex, but also the accuracy of the test is reduced.

Furthermore, in the above existing technologies, the torque tests the total torque on the main shaft of the experimental device. However, while starting, the staring torque is 5-7 times that of normal operation. Therefore, the diameter of the stress shaft of the torque sensor is larger. The torque sensor is used to test the smaller end-face friction torque of mechanical seal at the normal operation state, the generated axial stress is smaller, the measurement accuracy is lower. To improve the measurement accuracy, the diameter of the stress shaft of the torque sensor should be reduced. However, it is easy for the stress shaft with smaller diameter to generate plastic deformation, even fracture. Therefore, two aspects are mutually exclusive.

SUMMARY OF THE PRESENT INVENTION

An object of the present invention is to provide a device for testing mechanical seal performance, which is capable of achieving automatic symmetric positioning of two groups of mechanical seals to be tested with respect to the center cross section of the working chamber, and an equal regulation of the end-face specific pressure, avoiding an additionally axial force caused by the medium while experimenting, simultaneously improving on-site installation workability and measurement accuracy of the end-face friction torque, which is adapted for performance researches and type tests of mechanical seal with large diameter under high pressure.

The device for testing mechanical seal performance comprises a main shaft 4, a working chamber 18 with two end covers respectively located at two ends thereof, and two groups of mechanical seals to be tested; where in each group of mechanical seal comprises a stationary O-ring 71, a stationary ring 72, a rotating ring 73, a rotating O-ring 74, a support ring 75, a spring 76, a rotating ring seat 77; the rotating ring 73 and the rotating ring seat 77 are axially slidably connected and are circumferentially positioned with each other; the spring 76, the support ring 75 and the rotating O-ring 74 are located between the rotating ring seat 77 and the rotating ring 73 in sequence; the support ring 75 is axially slidably connected with the rotating ring seat 77; the stationary ring 72 is connected with center holes on the end covers via the stationary O-ring 71 provided on a periphery of the stationary ring 72 by a sealed manner; the stationary ring 72 is axially opposite to the rotating ring 73;

the shaft sleeve 5 in clearance fit with the main shaft 4 is sleeved on the main shaft 4, the shaft sleeve 5 passes through the end covers at the two ends of the working chamber 18; U-shaped openings 23 on a same generatrix are respectively provided at two ends of the shaft sleeve 5 extending outside the end covers, drive pins are located at the main shaft 4 corresponding to the U-shaped openings 23; two segments of thread with a same screw pitch and an opposite rotation direction are provided at a middle part of the shaft sleeve 5; two nuts respectively match with the two segments of thread; two short pins 10, which are parallel to an axis of the shaft sleeve 5, are respectively simultaneously inserted into short pin holes on the two nuts; the rotating ring seat 77 of each of the two groups of mechanical seals is located at a back of one of the two nuts; the rotating ring seat 77 is axially slid and circumferentially positioned with the shaft sleeve; both the stationary ring 72 and the rotating ring 73 surround the shaft sleeve;

a radially installed force sensor, adapted for testing a force between a sidewall of one of the U-shaped openings and one of the drive pins, is located between the sidewall of one of the U-shaped openings and one of the drive pins; a technological hole, for allowing a technological shaft to pass through, is provided on at least one of the end covers, the technological shaft passing through the technological hole is inserted into the short pin holes; the technological hole is sealed by a detachable technological hole plug 24.

While operating, firstly the two nuts are respectively screwed and jointed to two segments of threads on the shaft sleeve, the short pins 10 are inserted into the short pin holes on a left nut 8 and a right nut 11 for circumferentially positioning the two nuts; and then the rotating ring seats 77, the springs 76, the support rings 75, the rotating O-rings 74 and the rotating rings 73 of the two groups of mechanical seals are symmetrically installed to the shaft sleeve 5; the stationary rings 72 with the stationary O-rings 71 are respectively installed into the center holes of the two end covers, and then an end cover with one stationary ring 72 (such as a left end cover at a left side) is connected to an end face (such as a left end face at the left side) of the working chamber 18, the working chamber 18 is moved to pass through the main shaft 4; and then the shaft sleeve 5, with the two nuts and the rotating rings 73, is sleeved on the main shaft 4, the other end cover (such as a right end cover at a right side) with the other stationary ring 72 is connected with the other end face (such as a right end face at the right side) of the working chamber 18; the main shaft 4 and the shaft sleeve 5 respectively pass out of the two end covers.

The technological shafts pass through the technological holes on the end covers to be inserted into the short pin holes on the nuts for avoiding the nuts to rotate, and then the shaft sleeve 5 is rotated to drive the two nuts which are screwed and jointed with the shaft sleeve to move back-to-back (so that a distance between the two nuts is gradually increased), the rotating ring seats 77 of the two groups of mechanical seals are driven to respectively press towards the rotating O-rings 74 and the rotating rings 73 via the springs 76 and the support rings 75, till the rotating rings 73 tightly press the stationary rings 72 to obtain a certain end-face specific pressure; of course, if the shaft sleeve 5 is reversely rotated to drive the two nuts which are screwed and jointed with the shaft sleeve to move face-to-face (so that the distance between the two nuts is gradually decreased), the springs 76 are changed from a compressed state to a free state, the end-face specific pressure is decreased till equals to zero or the rotating rings are detached from the stationary rings; because of the technological shafts being inserted into the short pin holes on the nuts, the two nuts move relatively to the main shaft 4 without rotation while rotating the shaft sleeve 5.

Due to the shaft sleeve 5 on the main shaft without axial positioning, when an initial position of a center cross section of the shaft sleeve 5 is not coincident with a center cross section of the working chamber 18, namely, when a distance between the initial position of the center cross section of the shaft sleeve 5 and an end-face of a stationary ring 72 on one end cover is not equal to a distance between the initial position of the center cross section of the shaft sleeve 5 and an end-face of a stationary ring 72 on the other end cover, the shaft sleeve 5 is rotated to drive the two nuts which are screwed and jointed with the shaft sleeve 5 to move back-to-back, the rotating ring seats 77 of the two groups of mechanical seals are driven to respectively press towards the rotating O-rings 74 and the rotating rings 73 via the springs 76 and the support rings 75; one group of mechanical seal which firstly presses the stationary ring 72 pushes the shaft sleeve 5 to move towards the other group of mechanical seal till the rotating ring 73 and the stationary ring 72 of the other group of mechanical seal contact with each other; and then the end-face specific pressure of the two groups of mechanical seals is increased together. Therefore, rotating the shaft sleeve 5 will center it automatically and allow the two groups of mechanical seals to obtain a same initial end-face specific pressure. The rotating O-ring 74 between the support ring 75 and the rotating ring 73 ensures the sealing between the rotating ring and the shaft sleeve.

And then, the drive pins are installed on the main shaft respectively corresponding to the U-shaped openings 23 of the shaft sleeve, the technological shafts are removed, the technological plugs are used to seal the technological holes. A test medium with a certain pressure is injected into the working chamber by an external medium loading and circulatory system.

And then, the main shaft is driven to rotate, the main shaft drives the shaft sleeve to rotate via the drive pins. Due to axial movement relatively to the shaft sleeve without rotating, the rotating ring seats rotate together with the shaft sleeve, so as to drive the rotating rings to tightly press the stationary rings for rotating relatively to the stationary rings. Due to a small torque between the shaft sleeve sleeved on the main shaft and the main shaft, the end-face friction torque is transmitted from the shaft sleeve to the main shaft without loss. The friction torque (the end-face friction torque of mechanical seal) between the rotating ring and the stationary ring is obtained by testing the torque of the shaft sleeve or the main shaft.

To test the end-face friction torque of mechanical seal, the radially installed force sensor, adapted for testing the force between the sidewall of one of the U-shaped openings and one of the drive pins, is located between the sidewall of one of the U-shaped openings and one of the drive pins.

The force, which is between the sidewall of one of the U-shaped openings and one of the drive pins and tested by the radially installed force sensor, is multiplied by an arm of force (which is a distance from an action point of the force to the axis of the shaft sleeve) to obtain the torque of the shaft sleeve or the main shaft.

A leakage amount of mechanical seal is obtained by weighing the liquid flowing out the center holes of the end covers.

Therefore, the present invention has some beneficial effects as follows:

(1) Two groups of mechanical seals to be tested are installed to the shaft sleeve which penetrates through the working chamber, in such a manner that the axial force and the spring force which are caused by the pressure medium acting on the two groups of mechanical seals are self-balanced, so that the axial force at the shaft ends generated by the pressure medium is avoided, which is adapted for various working conditions and sizes including performance test of mechanical seal with large diameter under high pressure.

(2) The shaft sleeve is in clearance fit with the main shaft without axial positioning on the main shaft, so that the mechanical seal installed on the shaft sleeve is able to be automatically centered in the working chamber. When the initial position of the center cross section of the shaft sleeve is not coincident with the center cross section of the working chamber, namely, when the distance between the initial position of the center cross section of the shaft sleeve and the end-face of the stationary ring on the left end cover is not equal to the distance between the initial position of the center cross section of the shaft sleeve and the end-face of the stationary ring on the right end cover, the shaft sleeve is rotated to drive the two nuts which are screwed and jointed with the shaft sleeve to move back-to-back, so as to drive the rotating ring seats of the two groups of mechanical seals to respectively press towards the rotating O-rings and the rotating rings via the springs and the supporting rings. The group of mechanical seal which firstly presses the stationary ring pushes the shaft sleeve to move towards the other group of mechanical seal till the end-face specific pressures of the two groups of mechanical seals are the same.

(3) The end-face friction torque of the mechanical seal is able to be accurately measured. Two groups of mechanical seals are installed on the shaft sleeve which is in clearance fit with the main shaft, the end-face wear torque is transmitted via the shaft sleeve to the main shaft without any loss, the force tested by the radially installed force sensor is calculated again to obtain the end-face friction torque, thereby ensuring the measurement accuracy of the end-face friction torque of the mechanical seal.

(4) The two groups of mechanical seals to be tested with a certain end-face specific pressure form a soft supporting of the main shaft, thereby enhancing the running stability of the cantilever main shaft.

(5) The leakage amount of the single group of mechanical seal is represented by an average value of the accumulated leakage amount of the two groups of mechanical seals, the end-face friction torque of the single group of mechanical seal is represented by the average value of the end-face friction torque of the two groups of mechanical seals, thus reducing the impact of randomness on the measurement.

(6) Convenient assembly and disassembly. The two groups of mechanical seals are installed to the shaft sleeve and then installed into the working chamber, the end-face specific pressure thereof is balanced by rotating the shaft sleeve, thereby ensuring the position of the shaft sleeve on the main shaft and the mechanical seal in the working chamber; when the right end cover is opened and the drive pins on a right end of the main shaft are removed, the shaft sleeve and the mechanical seal on the shaft sleeve are able to be removed.

(7) By replacing the shaft sleeves with different structure sizes, the shaft sleeve match with the mechanical seal to be tested on the model numbers and sizes, so as to test the performance of the mechanical seals with different sizes and model numbers.

At least two axial force sensors 14, adapted for testing the axial force of the stationary rings 72, pass through the end covers and contact with backs of the stationary rings 72 opposite to the rotating rings 73; the axial force sensors 14 are evenly distributed at the periphery of the stationary ring 72. While no medium exists in the working chamber, the axial force sensors 14 located on one end cover 13 for supporting one stationary ring 72 axially bears the spring force for maintaining the attachment between the rotating ring 73 and the stationary ring 72; after injecting the pressure medium into the working chamber, the axial force sensors 14 for supporting one stationary ring 72 axially bear a sum of the spring force and the axial force caused by the pressure medium in the single group of mechanical seal. By the axial force sensors, the initial spring specific pressure of the mechanical seal is capable of being accurately measured and the change of the end-face specific pressure during operation after loading is capable of being monitored.

In the above device for testing mechanical seal performance, the short pins 10 are in clearance fit with the short pin holes on the two nuts for reducing the resistance of relative axial movement of the two nuts towards the short pins.

In the above device for testing mechanical seal performance, the rotating ring seats 77 are connected with the shaft sleeve 5 via the guide flat keys 12.

In the above device for testing mechanical seal performance, guide holes are provided on the nuts, an axis of the guide holes is parallel to the axis of the shaft sleeve; the technological shafts penetrating through the technological holes are inserted into the short pin holes or the guide holes. The technological holes, the guide holes and the short pin holes are symmetrical with respect to the axis of the shaft sleeve.

In the above device for testing mechanical seal performance, the shaft sleeve 5 is symmetrical with respect to the center cross section; the two groups of mechanical seals are symmetrically located at two sides of the center cross section of the shaft sleeve 5, in such a manner that the shaft sleeve and the two groups of mechanical seals are symmetrical with respect to the center cross section of the shaft sleeve 5, so that the axial force and the spring force caused by the pressure medium acting on the two groups of mechanical seals are self-balanced, avoiding the pressure medium to generate the axial force on the main shaft or the shaft sleeve.

In the above device for testing mechanical seal performance, the end covers have a ring groove which is concentric with the center hole to form a leakage chamber 16; a deflector hole 17 is provided at a bottom of the ring groove along a tangential direction for collecting and discharging the leakage amount of mechanical seal.

In the above device for testing mechanical seal performance, the radially installed force sensors are wireless force sensors.

In the above device for testing mechanical seal performance, the main shaft is connected with the motor 1 via a bearing box 3 and a coupling 2, the motor 1 is controlled by the frequency converter to adjust the speed.

In the drawings: 1-motor; 2-coupling; 3-bearing box; 4-main shaft; 5-shaft sleeve; 6-left end cover; 7-mechanical seal to be tested (wherein 71-stationary O-ring; 72-stationary ring; 73-rotating ring; 74-rotating O-ring; 75-support ring; 76-spring; 77-rotating ring seat); 8-left nut; 9-short pin hole plug; 10-short pin; 11-right nut; 12-guide flat key; 13-right end cover; 14-axial force sensor; 15-drive pin; 16-leakage chamber; 17-deflector hole; 18-working chamber; 19-carriage; 20-stand; 22-technological shaft; 23-U-shaped opening; 23-technological hole plug; 25-guide hole.

DETAILED DESCRIPTION OF THE PREFERRED EMBODIMENT

The present invention is further illustrated combined with the following drawings and implements.

Figure 1:
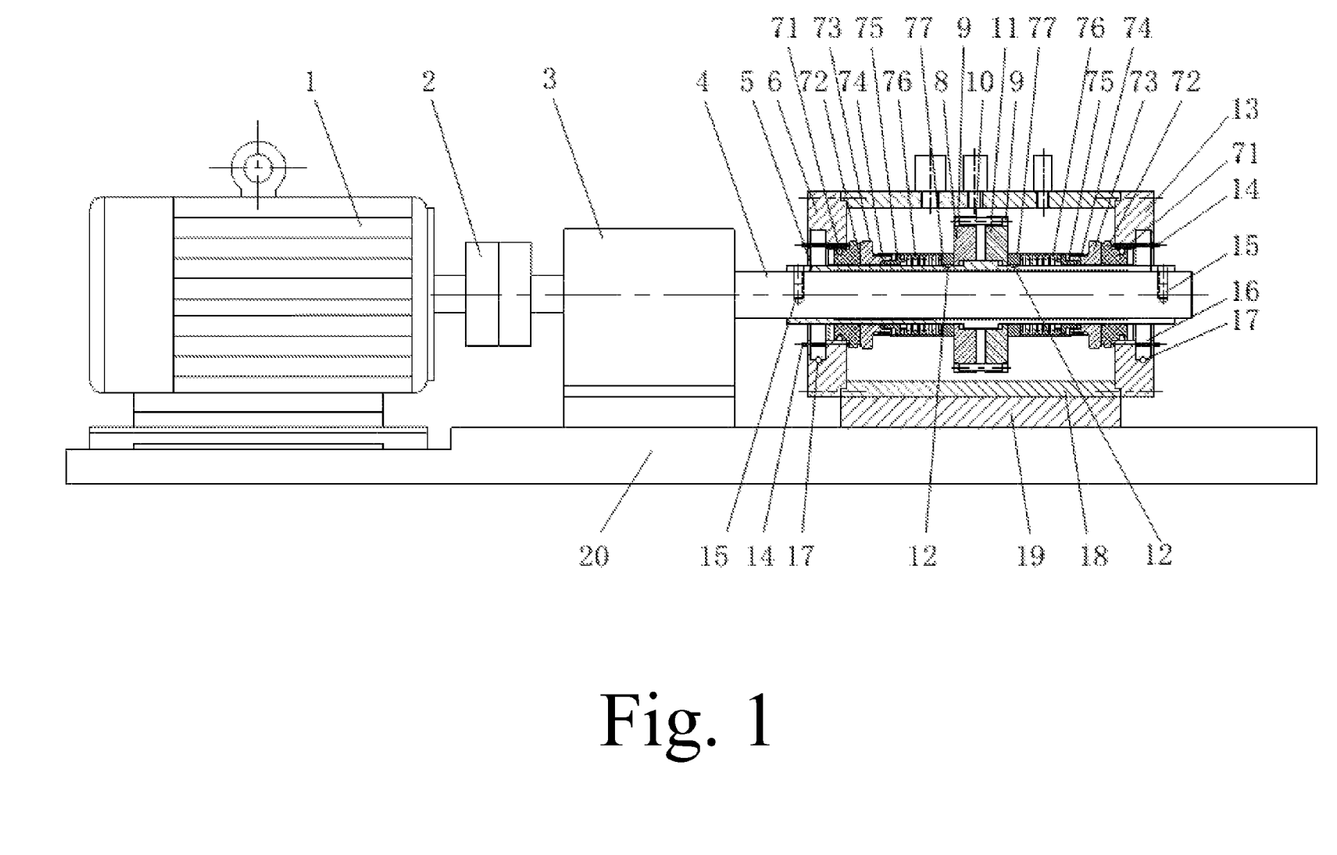
FIG. 1 is an axial cross section of a device for testing mechanical seal performance
Figure 2:
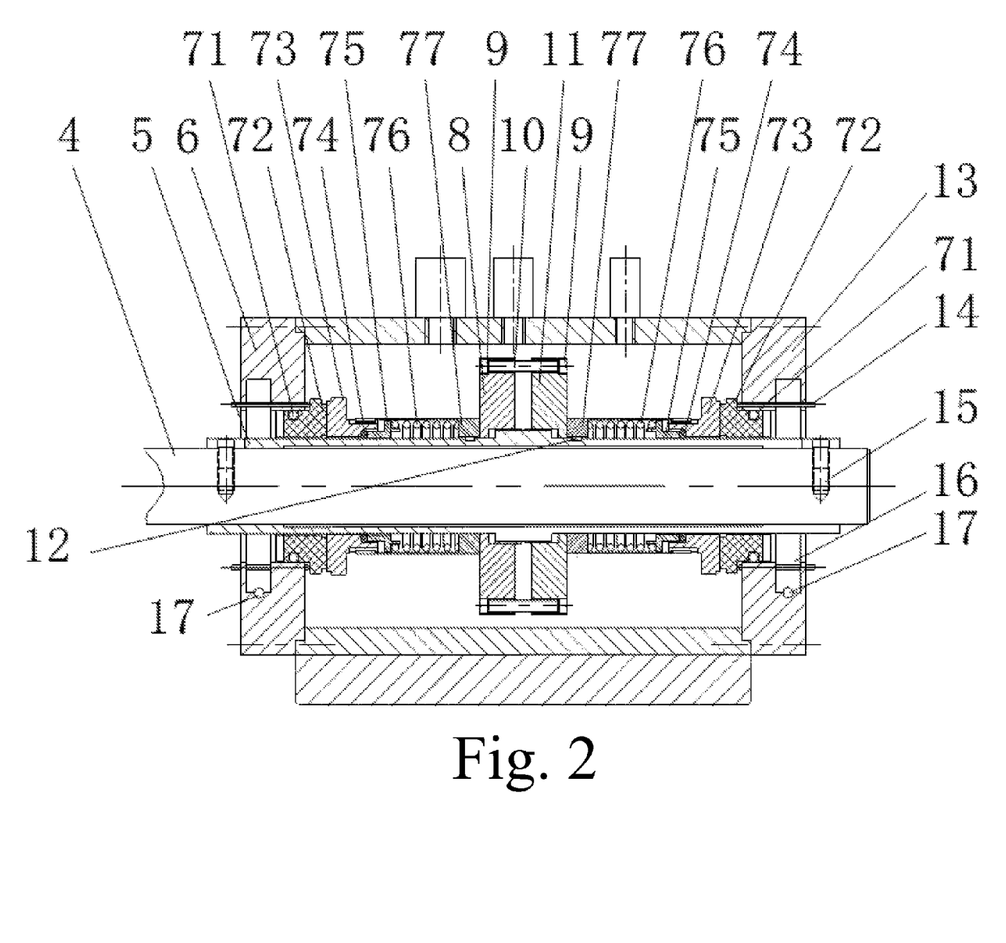
FIG. 2 is an enlarged view of a shaft sleeve and the mechanical seal to be tested in FIG. 1.

To further understand the contents, characteristics and effects of the present invention are described in detail as follows combined with the drawings:

FIGS. 1 and 2 show a device for testing a mechanical seal performance which comprises a motor 1, a coupling 2, a bearing box 3, a main shaft 4, drive pins 15, a shaft sleeve 5, a left end cover 6, technological hole plugs 24, technological shafts 22, axial force sensors 14, two groups of mechanical seals to be tested (a stationary O-ring 71 a stationary ring 72, a rotating ring 73, a rotating O-ring 74, a support ring 75, a spring 76, a rotating ring seat 77), guide flat keys 12, a left nut 8, a right nut 11, short pins 10, short pin hole plugs 9, a working chamber 18, a right end cover 13, a carriage 19 and a stand 20.

Figure 3:
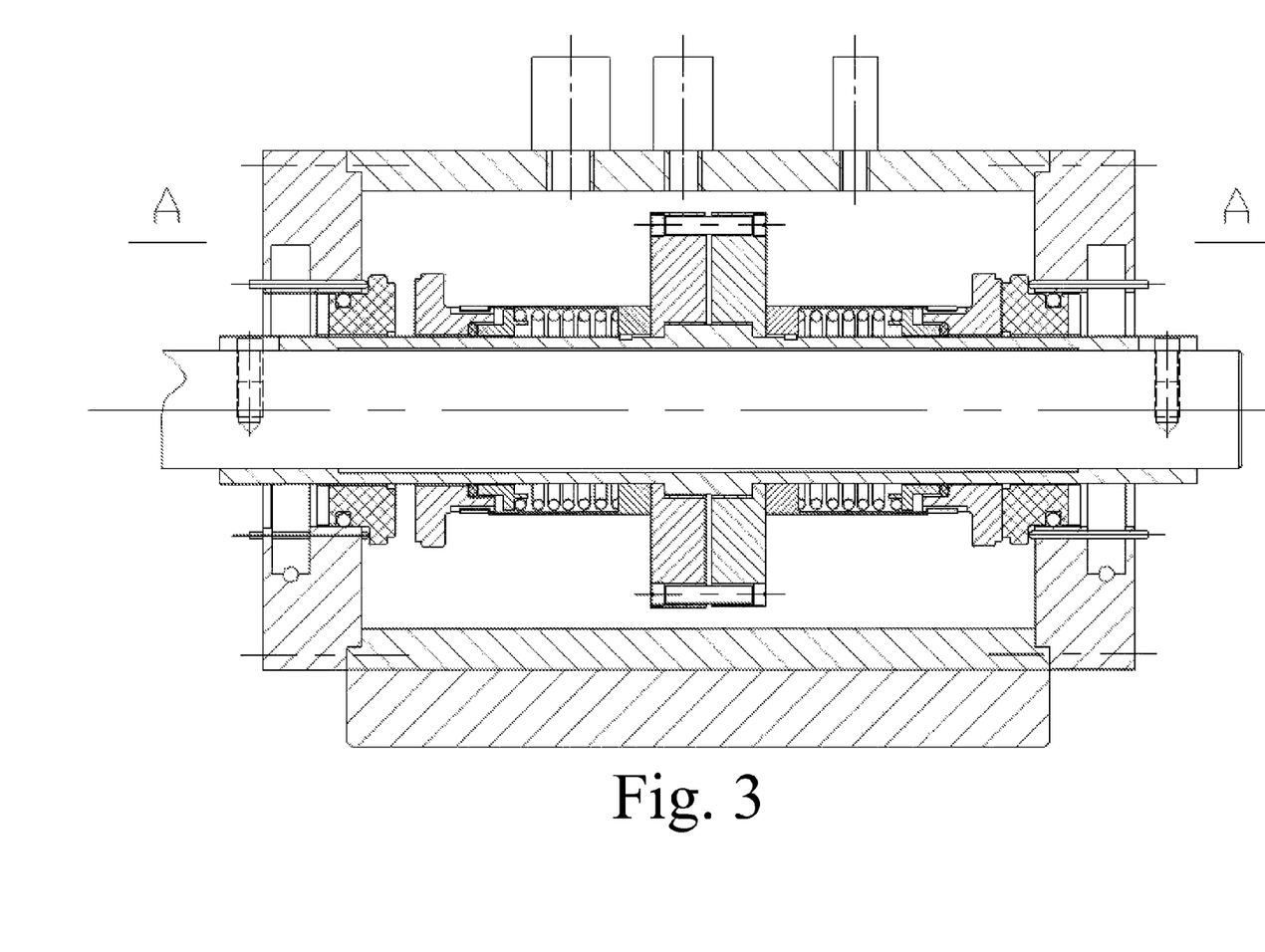
FIG. 3 is an axial cross section of a device for testing mechanical seal performance during installing and adjusting the mechanical seal to be tested.
Figure 4:
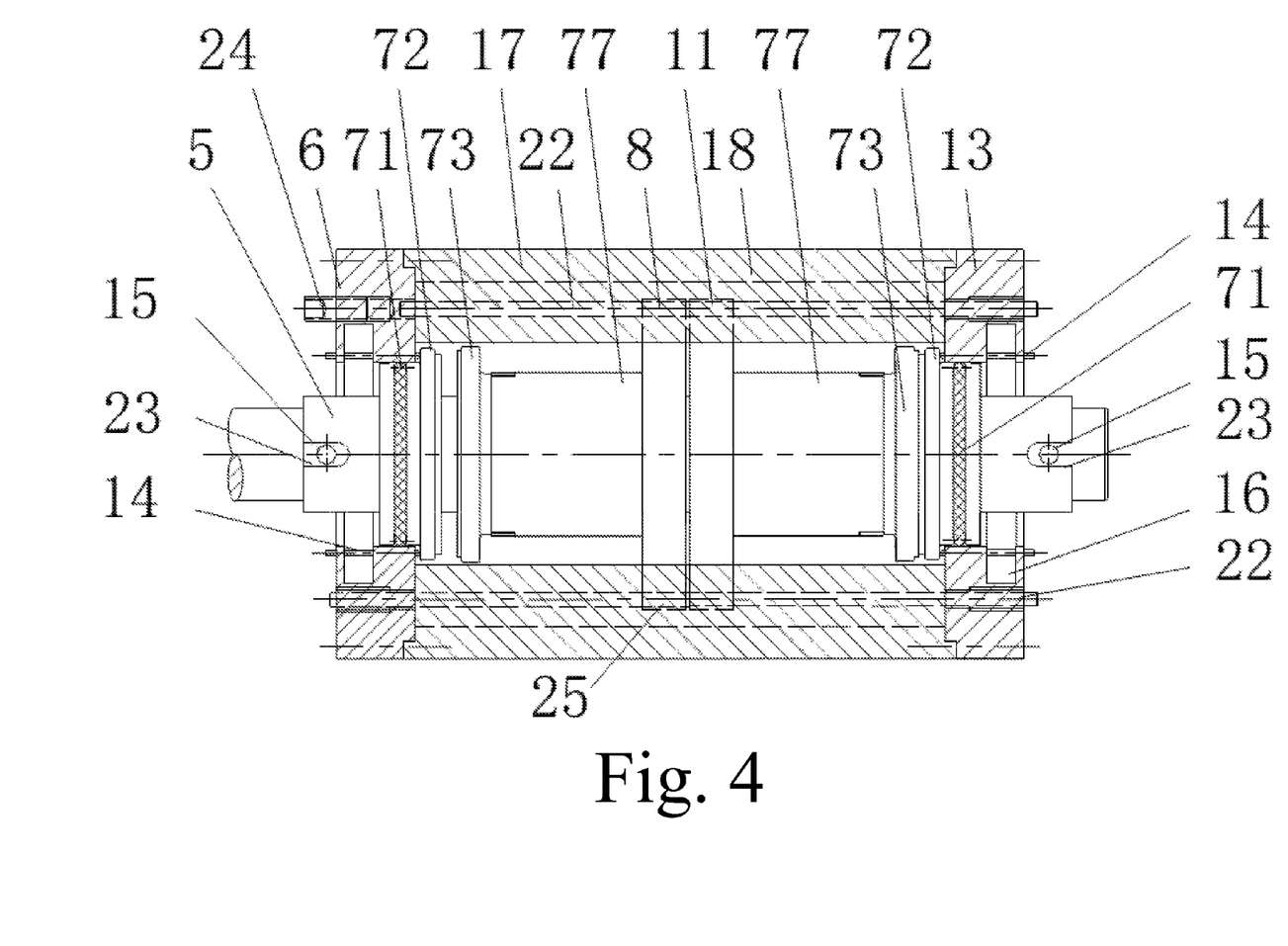
FIG. 4 is a cross section along A-A of the device for testing mechanical seal performance.

The shaft sleeve 5 has a symmetrical structure with respect to a center cross section. Two U-shaped openings 23 are respectively provided on a same generatrix at two ends of the shaft sleeve 5 and two segments of single threads with a same screw pitch and an opposite rotation direction (wherein a left-hand thread is screwed and jointed with the left nut 8, and a right-hand thread is screwed and jointed with the right nut 11) are provided at a middle part of the shaft sleeve 5. The left nut 8, the right nut 11, the short pins 10, the short pin hole plugs 9, the guide flat keys 12 and two groups of mechanical seals to be tested with a same size are installed on the shaft sleeve 5 back to back, wherein each group comprises the rotating ring seat 77, the spring 76, the support ring 75, the rotating O-ring 74 and the rotating ring 73. The shaft sleeve 5 is in clearance fit with the main shaft 4, and penetrates through the left end cover 6, the working chamber 18 and the right end cover 13 along with the main shaft 4. The two rotating rings 73 on the shaft sleeve 5 are respectively opposite to two stationary rings 72 of the two groups of mechanical seals to be tested which are installed on the left end cover 6 and the right end cover 13. The stationary O-rings 71 are located between the stationary rings 72 and the left end cover 6, the right end cover 13 for sealing. Six axial force sensors 14 respectively located at the left end cover 6 and the right end cover 13 respectively contact with two backs of the two stationary rings 72 for axially supporting the two stationary rings 72. Two short pin holes are provided on the left nut 8 and are symmetrical to each other with respect to an axis of the shaft sleeve 5, the right nut 11 has a same structure, namely, two short pin holes are provided on the right nut 11 and are symmetrical to each other with respect to an axis of the shaft sleeve 5. There are two short pins 10, one short pin 10 simultaneously inserts into one short pin hole in the left nut 8 and one short pin hole in the right nut 11, the other short pin 10 simultaneously inserts into the other short pin hole in the left nut 8 and the other short pin hole in the right nut 11, in such a manner that the left nut 8 and the right nut 11 are circumferentially positioned with the two short pins 10. Each short pin 10 is in clearance fit with two corresponding short pin holes. Two short pin hole plugs 9 are respectively axially positioned for avoiding the two short pins 10 falling off from the four short pin holes. Two guide holes 25 are respectively provided on the left nut 8 and the right nut 11 and are symmetrical to each other with respect to the axis of the shaft sleeve. Two technological holes are respectively provided on the two end covers for allowing the technological shaft 22 to penetrate through and are symmetrical to each other with respect to the axis of the shaft sleeve. The two technological holes are respectively sealed by two detachable technological hole plugs 24. The two rotating ring seats 77 whose mechanical performance to be tested are respectively circumferentially positioned with the shaft sleeve 5 by two guide flat keys 12. While rotating the shaft sleeve 5, two technological shafts 22 respectively penetrate through four technological holes on the left end cover 6 and the right end cover 13, and insert into two guide holes 25, as shown in FIGS. 3 and 4. The shaft sleeve 5 is clockwise rotated to drive the left nut 8 and the right nut 11 which are screwed and jointed with the shaft sleeve 5, to move left and right equidistantly, so as to drive the rotating ring seats 77 of the two groups of mechanical seals to respectively press towards the rotating O-rings 74 and the rotating rings 73 via the springs 76 and the support rings 75, till tightly press the stationary rings 72 for obtaining a certain end-face specific pressure.

The drive pins 15 are fixed on the main shaft 4 where two U-shaped openings 23 are respectively provided at two ends of the shaft sleeve 5, such that the shaft sleeve 5 is circumferentially positioned. A force between a side wall of each of the two U-shaped openings and a corresponding drive pin is tested by a radially installed force sensor. The force is multiplied by an arm of force (which is a distance from an action point of the force to the axis of the shaft sleeve) to obtain a torque of the shaft sleeve (the main shaft).

Both the left end cover 6 and the right end cover 13 have a ring groove which is concentric with a center hole to form a leakage chamber 16. A deflector hole 17 is provided at a bottom of the ring groove along a tangential direction thereof for collecting and discharging a leakage amount of the mechanical seal. The leakage amount of the mechanical seal is represented by an average value of the accumulated leakage amount of two groups of mechanical seals in the leakage chamber 16. The force tested by the radially installed force sensor is calculated again to obtain an average value of an end-face friction torque of the two groups of mechanical seal. The end-face friction torque of a single group of mechanical seal is represented by the average value. Three radially installed force sensors 14, which are uniformly distributed along a circumferential direction of the left end cover 6 and the right end cover 13, with a same model number and have a same height from measuring points thereof to a corresponding end face of the left and right end cover, are adapted for measuring an attached end-face specific pressure of the rotating ring 73 and the stationary ring 72.

The shaft sleeve 5 is counterclockwise rotated to drive the left nut 8 and the right nut 11 which are screwed and jointed with the shaft sleeve 5 to respectively move right and left equidistantly, springs 76 are changed from a compressed state to a free state, and the end-face specific pressure is decreased till equals to zero or the rotating ring is detached from the stationary ring. While rotating the shaft sleeve 5, the left nut 8 and the right nut 11 move relatively to the main shaft 4 without rotating.

A variable frequency speed controller controls the motor 1 for allowing the main shaft 4 to operate under different rotating speeds. The structure size of the shaft sleeve 5 is changed to allow a performance test of mechanical seals with different sizes and model numbers.

FIG. 3 is an axially sectional view of a device for testing mechanical seal performance during installing and adjusting the mechanical seal to be tested. The shaft sleeve 5 makes a clearance fit with the main shaft 4 without axial positioning on the main shaft. When an initial position of a center cross section of the shaft sleeve 5 is not coincident with a center cross section of the working chamber 18, namely, when the distance between the initial position of the center cross section of the shaft sleeve 5 and an end-face of a stationary ring 72 on the left end cover 6 is not equal to the distance between the initial position of the center cross section of the shaft sleeve 5 and an end-face of a stationary ring 72 on the right end cover 13, the technological shafts 22 are inserted into the short pin holes of the left nut 8 and the right nut 11, and the technological holes of the left end cover 6 and the right end cover 13. The shaft sleeve 5 is clockwise rotated to drive the left nut 8 and the right nut 11 which are screwed and jointed with the shaft sleeve 5 to respectively move left and right equidistantly, so as to drive the rotating ring seats 77 of two groups of mechanical seal to respectively press towards the rotating O-rings 74, and the rotating rings 73 via the springs 76 and the supporting rings 75. One group of mechanical seal which is firstly pressed to the corresponding stationary ring 72 pushes the shaft sleeve 5 to move towards the other group of mechanical seal till the rotating ring 73 and the stationary ring 72 of the other group of mechanical seal contact with each other, and then the end-face specific pressure of the two groups of mechanical seals is increased together.

While operating, firstly the left nut 8 and the right nut 11 are screwed and jointed to screw threads at a middle of the shaft sleeve 5, the short pins 10 are inserted into the holes of the left nut 8 and the right nut 11, and then the short pin hole plugs 9 are screwed therein for circumferentially positioning the left nut 8 and the right nut 11. And then, the guide flat keys 12, the rotating ring seats 77, the springs 76, the support rings 75, the rotating O-rings 74, and the rotating rings 73 are symmetrically installed to the shaft sleeve 5; the stationary rings 72 with the stationary O-ring 71 are respectively installed into the left end cover 6 and the right end cover 13, and then the left end cover 6 with the axial force sensor 14 and the stationary ring 72 is connected to a left end face of the working chamber 18 via bolts, the working chamber 18 is moved for allowing the left end cover 6 and the working chamber 18 to pass through the main shaft 4; and then the shaft sleeve 5, with the left nut 8, the right nut 11, the guide flat keys 12 and the rotating rings 73, is sleeved on the main shaft 4, and then the right end cover 13 with the axial force sensor 14 and the stationary ring 72 is connected to the right end face of the working chamber 18 by bolts; at this time, the main shaft 4 and the shaft sleeve 5 pass out of the right end cover 13.

The technical shafts 22 are inserted into the guide holes 25 on the left nut 8 and the right nut 11 and the technological holes on the left end cover 6 and the right end cover 13. The shaft sleeve 5 is clockwise rotated to automatically center the shaft sleeve 5, and allows the mechanical seals to obtain an initial end-face specific pressure needed. The drive pins 15 are installed on the main shaft corresponding to the U-shaped openings 23 of the shaft sleeve, and the technological shafts 22 are removed (of course, the short pin hole plugs 9 are taken out of the short pin holes, the technological shafts 22 pass through the technological holes on the left end cover 6 and the right end cover 13 and are inserted into two short pin holes on the left nut 8 and the right nut 11, the shaft sleeve 5 is clockwise rotated to automatically center the shaft sleeve 5, and allows the mechanical seals to obtain the initial end-face specific pressure to be needed, the drive pins 15 are installed on the main shaft corresponding to the U-shaped openings 23 of the shaft sleeve, the technological shafts 22 are removed, and then the short pin hole plugs 9 are inserted into the short pin holes), the technological hole plugs 24 are tightened within the technological holes on the left end cover 6 and the right end cover 13. A test medium with a certain pressure is injected into the working chamber by an external medium loading and circulatory system. A working end-face specific pressure of the mechanical seal is obtained by the axial force sensors 14.

The motor 1 is started and the frequency transformer is adjusted for allowing the mechanical seal to operate under a rotation speed what is needed. The end-face friction torque and the leakage amount of the mechanical seal are obtained by the force tested by the radially installed force sensors and a weight of the liquid accumulated in the leakage chamber 16 and flowing out through the deflector holes 17.

The torque (namely, the force tested by the radially installed force sensors is multiplied by the arm of force which is a distance from the action point of the force to the axis of the shaft sleeve) indirectly tested by the radial force sensors is equal to the end-face friction torque of the mechanical seal rotating ring 73 and the stationary ring 72 which is transferred to the shaft sleeve 5 via the springs 76 and the rotating ring seats 77, the end-face friction torque of a single group of mechanical seal is represented by the average value of the end-face friction torque of the two groups of mechanical seals indirectly tested by the radially installed force sensors. If a radially installed force sensor is located on only one drive pin, then the torque indirectly tested by the radially installed force sensor is divided by two to obtain the end-face friction torque of the single group of mechanical seal. If two radially installed force sensors are respectively located on two drive pins, then a sum of the torque indirectly tested by the two radially installed force sensors is divided by two to obtain the end-face friction torque of the single group of mechanical seal.

Advantages and positive effects of the present invention are as follows.

(1) Two groups of mechanical seals with a same size are installed to the shaft sleeve which penetrates through the working chamber and is symmetrical with respect to the center cross section, in such a manner that the axial force and the spring force which are caused by the pressure medium acting on the two groups of mechanical seals are self-balanced, so that the axial force at the shaft ends generated by the pressure medium is avoided, which is adapted for various working conditions and sizes including mechanical seal performance test under high pressure and large diameter.

(2) The shaft sleeve makes the clearance fit with the main shaft without axial positioning on the main shaft, so that the mechanical seal installed on the shaft sleeve is able to be automatically adjusted in the working chamber. When the initial position of the center cross section of the shaft sleeve is not coincident with the center cross section of the working chamber, namely, when the distance between the initial position of the center cross section of the shaft sleeve and the end-face of the stationary ring on the left end cover is not equal to the distance between the initial position of the center cross section of the shaft sleeve and the end-face of the stationary ring on the right end cover, the shaft sleeve is rotated to drive the left nut and the right nut which are screwed and jointed with the shaft sleeve to respectively move left and right equidistantly, so as to drive the rotating ring seats of two groups of mechanical seal to respectively press towards the rotating O-rings and the rotating rings via the springs and the supporting rings. One group of mechanical seal which is firstly pressed to the corresponding stationary ring" pushes the shaft sleeve to move towards the other group of mechanical seal till the end-face specific pressures of the two groups of mechanical seals are same.

(3) The end-face friction wear torque of the mechanical seal is able to be accurately measured. Two groups of mechanical seals are installed on the shaft sleeve which is in clearance fit with the main shaft, the end-face friction wear torque is transmitted via the shaft sleeve to the drive pins within the U-shaped openings at two ends of the shaft sleeve on the main shaft without any loss, thereby ensuring the measurement accuracy of the end-face friction wear torque of the mechanical seal.

(4) The axial force sensors located on the left and right end covers are able to accurately measure the initial spring specific pressure of mechanical seal and monitor the change of the end-face specific pressure during operation.

(5) Two groups of mechanical seals with a same size and a same end-face specific pressure are adopted together. The leakage amount of the single group of mechanical seal is represented by an average value of the accumulated leakage amount of two groups of mechanical seals, the end-face friction torque of the single group of mechanical seal is represented by the average value of an end-face friction torque of the two groups of mechanical seals, thus reducing the impact of randomness on the measurement.

What is claimed is:

1. A device for testing mechanical seal performance, comprising: a main shaft (4), a working chamber (18) with two end covers respectively located at two ends thereof, and two groups of mechanical seals to be tested; wherein each group of mechanical seal comprises a stationary O-ring (71), a stationary ring (72), a rotating ring (73), a rotating O-ring (74), a support ring (75), a spring (76), a rotating ring seat (77); the rotating ring (73) and the rotating ring seat (77) are axially slidably connected and are circumferentially positioned with each other; the spring (76), the support ring (75) and the rotating O-ring (74) are located between the rotating ring seat (77) and the rotating ring (73) in sequence; the support ring (75) is axially slidably connected with the rotating ring seat (77); the stationary ring (72) is connected with center holes on the end covers via the stationary O-ring (71) provided on a periphery of the stationary ring (72) by a sealed manner; the stationary ring (72) is axially opposite to the rotating ring (73);

wherein the shaft sleeve (5) in clearance fit with the main shaft (4) is sleeved on the main shaft (4), the shaft sleeve (5) passes through the end covers at the two ends of the working chamber (18); U-shaped openings (23) on a same generatrix are respectively provided at two ends of the shaft sleeve (5) extending outside the end covers,and drive pins are located at the main shaft (4) corresponding to the U-shaped openings (23); two segments of thread with a same screw pitch and an opposite rotation direction are provided at a middle part of the shaft sleeve (5); two nuts respectively match with the two segments of thread; two short pins (10) which are parallel to an axis of the shaft sleeve (5), are respectively simultaneously inserted into short pin holes on the two nuts; the rotating ring seat (77) of each of the two groups of mechanical seals is located at a back of one of the two nuts; the rotating ring seat (77) is axially slid and circumferentially positioned with the shaft sleeve; both the stationary ring (72) and the rotating ring (73) surround the shaft sleeve;

wherein a radially installed force sensor, adapted for testing a force between a sidewall of one of the U-shaped openings and one of the drive pins, is located between the sidewall of one of the U-shaped openings and one of the drive pins; a technological hole, for allowing a technological shaft to pass through, is provided on at least one of the end covers, the technological shaft passing through the technological hole is inserted into the short pin holes; the technological hole is sealed by a detachable technological hole plug (24).

2. The device for testing mechanical seal performance, as recited in claim 1, wherein at least two axial force sensors (14), adapted for testing an axial force of the stationary ring (72), pass through the end covers and contact with a back of the stationary ring (72) opposite to the rotating ring (73); the axial force sensors (14) are evenly distributed at a periphery of the stationary ring (72).

3. The device for testing mechanical seal performance, as recited in claim 1, wherein the short pins (10) are in clearance fit with the short pin holes on the two nuts.

4. The device for testing mechanical seal performance, as recited in claim 1, wherein the rotating ring seat (77) is connected with the shaft sleeve (5) via the guide flat key (12).

5. The device for testing mechanical seal performance, as recited in claim 1, wherein guide holes are provided on the nuts, an axis of the guide holes is parallel to the axis of the shaft sleeve; the technological shafts penetrating through the technological holes are inserted into the short pin holes or the guide holes.

6. The device for testing mechanical seal performance, as recited in claim 5, wherein the technological holes, the guide holes and the short pin holes are symmetrical with respect to the axis of the shaft sleeve.

7. The device for testing mechanical seal performance, as recited in claim 1, wherein the shaft sleeve (5) is symmetrical with respect to the center cross section thereof; the two groups of mechanical seals are symmetrically located at two sides of the center cross section of the shaft sleeve (5).

8. The device for testing mechanical seal performance, as recited in claim 1, wherein the end covers have a ring groove which is concentric with the center hole to form a leakage chamber (16); a deflector hole (17) is provided at a bottom of the ring groove along a tangential direction thereof for collecting and discharging a leakage amount of mechanical seal.

9. The device for testing mechanical seal performance, as recited in claim 1, wherein the radially installed force sensors are wireless radially installed force sensors.

10. The device for testing mechanical seal performance, as recited in claim 1, wherein the main shaft (4) is connected with the motor (1) via the bearing box (3) and the coupling (2), the motor (1) is controlled by a variable frequency speed controller to adjust a speed.

* * * * *